(12) United States Patent
Fields et al.

(10) Patent No.: US 11,989,759 B2
(45) Date of Patent: May 21, 2024

(54) USING MACHINE LEARNING TECHNIQUES TO CALCULATE DAMAGE OF VEHICLES INVOLVED IN AN ACCIDENT

(71) Applicant: STATE FARM MUTUAL AUTOMOBILE INSURANCE COMPANY, Bloomington, IL (US)

(72) Inventors: Brian Mark Fields, Phoenix, AZ (US); Lee Marvin John Assam, El Paso, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 62 days.

(21) Appl. No.: 17/826,250

(22) Filed: May 27, 2022

(65) Prior Publication Data
US 2022/0284484 A1    Sep. 8, 2022

Related U.S. Application Data

(63) Continuation of application No. 15/675,077, filed on Aug. 11, 2017, now Pat. No. 11,379,886.

(51) Int. Cl.
*G06Q 30/02* (2023.01)
*G06Q 40/08* (2012.01)

(52) U.S. Cl.
CPC ......... *G06Q 30/0278* (2013.01); *G06Q 40/08* (2013.01)

(58) Field of Classification Search
CPC .................................................. G06Q 30/0278
See application file for complete search history.

(56) References Cited

U.S. PATENT DOCUMENTS

| | | |
|---|---|---|
| 9,505,494 B1 | 11/2016 | Marlow et al. |
| 11,379,886 B1 * | 7/2022 | Fields ................ G06Q 30/0278 |
| 2016/0239921 A1 * | 8/2016 | Bray ..................... G06Q 40/08 |
| 2017/0293894 A1 | 10/2017 | Taliwal et al. |

OTHER PUBLICATIONS

U.S. Appl. No. 16/158,118, Systems and Methods for Model-Based Analysis of Damage to a Vehicle, filed Oct. 11, 2018.
U.S. Appl. No. 16/158,137, Systems and Methods for Model-Based Analysis of Damage to a Vehicle, filed Oct. 11, 2018.

\* cited by examiner

*Primary Examiner* — Ojo O Oyebisi
(74) *Attorney, Agent, or Firm* — MARSHALL, GERSTEIN & BORUN LLP

(57) ABSTRACT

Disclosed systems and methods incorporate machine learning to assess damage to vehicles. An example method includes: accessing image data representing one or more digital images of damage to a vehicle; selecting, using one or more processors, an applicable machine learning algorithm from a plurality of different trained machine learning algorithms, wherein the plurality of different machine learning algorithms are trained for respective different combinations of one or more of vehicle make, vehicle model, vehicle year, or area of damage; processing the image data, with the applicable machine learning algorithm using one or more processors, to determine assessed damage for the vehicle; accessing actual damage information for the vehicle; determining, using one or more processors, differences between the actual damage and the assessed damage; and iterating, using one or more processors, the applicable machine learning algorithm based on the differences to improve its damage assessment accuracy.

20 Claims, 6 Drawing Sheets

USING MACHINE LEARNING TECHNIQUES TO CALCULATE DAMAGE OF VEHICLES INVOLVED IN AN ACCIDENT

RELATED APPLICATION

This application is a continuation of U.S. patent application Ser. No. 15/675,077, which was filed on Aug. 11, 2017. U.S. patent application Ser. No. 15/675,077 is hereby incorporated herein by reference in its entirety.

FIELD OF THE DISCLOSURE

This disclosure relates to a system and method for calculating damage to a vehicle based on received images and improving the calculations using machine learning techniques.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Damage may occur to a vehicle under a number of circumstances. For example, acts of nature such as inclement weather, animals, and/or human-involved accidents may cause damage to a vehicle. The damage may be unsightly or even dangerous and thus require restorative repairs.

In the event that damage occurs to a vehicle, inspectors are tasked with assessing the extent of the damage to determine the cost to complete repairs. Generally speaking, inspectors must obtain measurements and images of damage (e.g., the size of the damaged area, the number of components of the vehicles that are damaged, and the like) as well as other relevant information to properly assess the extent of the damage. An owner of a damaged vehicle may require multiple assessments to get an accurate evaluation of the damage. This process of receiving multiple assessments may be time-consuming and costly.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

One embodiment of the current disclosure provides a method implemented by a computer to estimate the damage to a vehicle. The method comprises receiving one or more images of a vehicle and subsequently retrieving, via a computer network, data from one or more remote databases, the data indicative of the damage to the vehicle. The method further comprises calculating damage to the vehicle based on the one or more images, the retrieved data, and a machine learning algorithm for calculating damage. The method then comprises receiving, via the computer network, an indication of actual damage to the vehicle. Further, the method comprises comparing the actual damage to the calculated damage and adjusting the machine learning algorithm for calculating damage based on the comparison between the actual damage and the calculated damage.

In another embodiment, the current disclosure provides a system for estimating the damage to a vehicle. The system may comprise a client device and a system server including one or more processors and one or more memories. The memories of the system server may include instructions executed on the one or more processors to receive one or more images of a vehicle and subsequently retrieve data from one or more remote databases, the data indicative of the damage to the vehicle. The instructions may cause the one or more processors to calculate damage to the vehicle based on the one or more images, the retrieved data, and a machine learning algorithm for calculating damage. The instructions may further cause the one or more processors to receive an indication of actual damage to the vehicle. The instructions may cause the one or more processors to compare the actual damage to the calculated damage and adjust the machine learning algorithm for calculating damage based on the comparison between the actual damage and the calculated damage.

In still another embodiment, the current disclosure provides a tangible computer-readable medium including non-transitory computer readable instructions stored thereon for estimating the damage to a vehicle. The instructions may comprise receiving one or more images of a vehicle and subsequently retrieving, via a computer network, data from one or more remote databases, the data indicative of the damage to the vehicle. The instructions may comprise calculating damage to the vehicle based on the one or more images, the retrieved data, and a machine learning algorithm for calculating damage. The instructions may further comprise receiving, via the computer network, an indication of actual damage to the vehicle. The instructions may comprise comparing the actual damage to the calculated damage and adjusting the machine learning algorithm for calculating damage based on the comparison between the actual damage and the calculated damage.

The features and advantages described in this summary and the following detailed description are not all-inclusive. Many additional features and advantages will be apparent to one of ordinary skill in the art in view of the drawings, specification, and claims hereof.

The figures depict embodiments of the present invention for purposes of illustration only. One skilled in the art will readily recognize from the following discussion that alternate embodiments of the structures and methods illustrated herein may be employed without departing from the principles of the invention described herein.

DETAILED DESCRIPTION

The emergence of big data and machine learning have opened the doors to a deeper understanding of our world. In particular, the above technology can be used to provide automated analysis of images. For example, images of a vehicle involved in an accident can be received and analyzed to determine the extent of the damage. The damage may be calculated based on a cost of repair or to determine if an ambulance or other emergency services should be summoned to the scene. Currently, damage is estimated by humans (e.g., inspectors at an auto body shop, bystanders at the scene of an accident) which may be flawed. By applying machine learning techniques when analyzing damage to vehicles based on images, some of the deficiencies that currently exist estimating damage to a vehicle may be eliminated by refining some machine learning algorithms.

Figure 1:
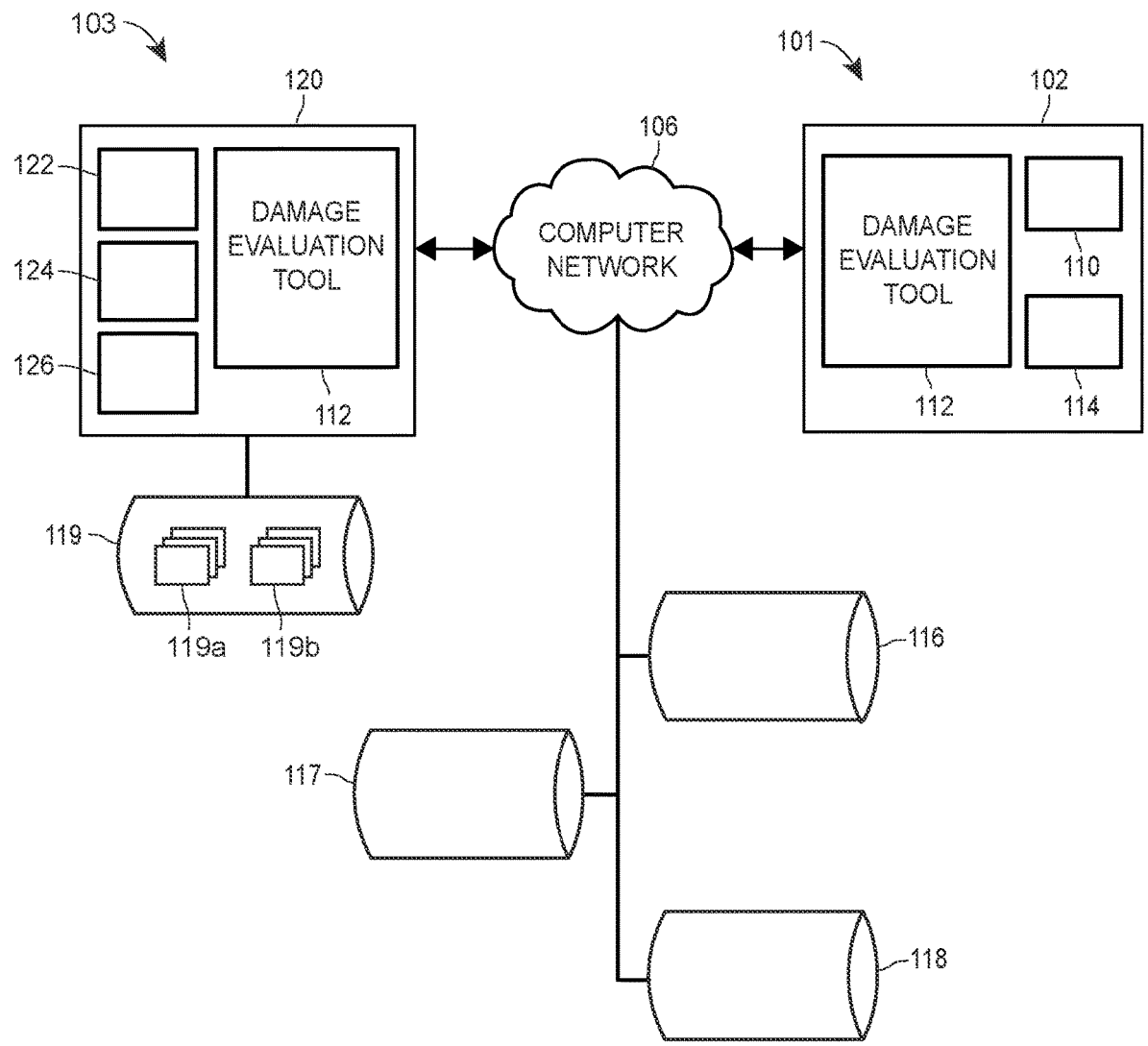
FIG. 1 is a simplified and exemplary block diagram of a system for calculating damage for vehicles based on one or more received images using machine learning algorithms.

FIG. 1 generally illustrates one embodiment for a system 100 to evaluate damage to a vehicle involved in an accident. The system 100 may include front end components 101 (e.g., client device 102) and backend components 103 (e.g., server 120) in communication with each other via a communication link 106 (e.g., computer network, internet connection, etc.). FIG. 1 illustrates a block diagram of a high-level architecture of a vehicle damage evaluation system 100 including various software or computer-executable instructions and hardware components or modules that may employ the software and instructions to evaluate damage to a vehicle. The various modules may be implemented as computer-readable storage memories containing computer-readable instructions (i.e., software) for execution by a processor of the computer system 100. The modules may perform the various tasks associated with evaluating damage to a vehicle, as herein described. The computer system 100 also includes both hardware and software applications, as well as various data communications channels for communicating data between the various hardware and software components.

The vehicle damage evaluation system 100 may include various entities at the front end that may communicate with the backend components evaluate damage to a vehicle. For example, the front end may contain a client device 102 that is capable of executing a graphical user interface (UI) 110 for a damage evaluation tool 112 within a web browser 114. The client device 102 may include a personal computer, smart phone, tablet computer, or other suitable computing device. In some embodiments, the client device 102 may be a drone (i.e., an unmanned aerial vehicle having an imaging sensor coupled thereto) or a client device 102 coupled to a drone. The UI 110 may communicate with the system 100 through the Internet 106 or other type of suitable network (local area network (LAN), a metropolitan area network (MAN), a wide area network (WAN), a mobile, a wired or wireless network, a private network, a virtual private network, etc.).

A system server 120 may send and receive information and data 116, 117, 118, 119 for the system 100 such as computer-executable instructions and data associated with applications executing on the client device 102 (e.g., the damage evaluation tool 112). The applications executing within the system 100 may include cloud-based applications, web-based interfaces to the data system 100, software applications executing on the client device 102, or applications including instructions that are executed and/or stored within any component of the system 100. The applications, UI 110, browser 114, and tool 112 may be stored in various locations including separate repositories and physical locations.

In some embodiments, the system 100 in general and the server 120 in particular may include computer-executable instructions 122 stored within a memory 124 of the server 120 and executed using a processor 126. The instructions 122 may initiate a damage evaluation tool 112 or send instructions to the client device 102 to initiate a UI 110 for the tool 112 using a web browser application 114 of the client device 102. In some embodiments, the browser application 114, UI 110, damage evaluation tool 112, and elements of the system 100 may be implemented at least partially on the server 120 and/or the client device 102. The data system 100 and processor 126 may execute instructions 122 to display interfaces on the UI 110 of the client device 102.

The server 120 may be communicatively coupled to a server database 119. The server database may store calculated damage 119a, machine learning algorithms 119b (for creating calculated damage 119a, and other data that may be necessary for evaluating damages to vehicles. A calculated damage 119a can be in the form of a monetary value for the cost of repairs for the vehicle or a numeric score indicating the severity of the damage. The calculated damage 119a can be an assessment of the damage to any vehicle (car, motorcycle, truck, etc.) of any make/model/year. The calculated damage 119a may be based on a number of factors, described in greater detail below.

Previously created calculated damage 119a may be used to create future calculated damage 119a. Further, the calculated damage 119a can be evaluated and compared to actual damages to determine the accuracy of the calculated damage 119a. The analysis of calculated damage 119a, described in greater detail below, can be implemented to refine machine learning algorithms 119b for creating future calculated damage 119a.

The machine learning algorithms 119b are intended to be continually refined through machine learning, and many different machine learning algorithms 119b can be created and applied to create calculated damage 119a. For example, machine learning algorithms 119b may be made for specific makes and/or models of vehicles. In some embodiments, machine learning algorithms 119b may be configured to calculate damage to particular areas of vehicles (e.g., the fender, the bumper). In some embodiments, two or more machine learning algorithms may be used in conjunction to calculate damages.

A machine learning algorithm 119b may consist of one or more sets of equations with a number of weighted variables. Through machine learning the one or more equations, the number of variables, and/or the weights of the variables may be adjusted to more accurately produce calculated damage 119a. For example, the system may determine that in a particular zip code the cost of repair is higher than another. In this example, the system may adjust the machine learning algorithms 119b such that vehicles damaged in the particular zip code are calculated to have higher damages (i.e., costly repairs) than vehicles damaged in other zip codes. The above example is merely for illustrative purposes and any number of factors may be adjusted to produce accurate damage calculations, described in greater detail below.

The server 120 and client device 102 may also be connected to one or more remote databases 116, 117, and 118. The remote databases may include manufacturer's data 116, insurance data 117, and repair data 118. Each of the databases 116, 117, and 118 may be accessed via the computer network with the proper consent. Any data from databases 116, 117, 118, and 119 may be used by the damage evaluation tool 112 to create calculated damage 119a as long as the data is publically accessible and/or privately accessible but provided by consent. The following examples of data for evaluating damage are illustrative and not intended to be limiting.

Further, although only one of each database is illustrated, the databases 116, 117, and 118 are representative of a number of databases of a particular type. For example, manufacturer's data 116 is representative of data from one or more vehicle manufacturers, each vehicle manufacturer housing private data separately from each other. By implementing a damage evaluation tool 112 that can facilitate communication between a front end 101, a backend 103 and one or more remote databases (116-118), the system promotes faster communication, consumes fewer system resources, and executes calculations more accurately and efficiently than a generic computing environment.

The manufacturer's data 116 may include data for creating calculated damage 119a from vehicle manufacturers. In one embodiment, the manufacturer's data 116 may include data indicative of the price of each component of a vehicle. In this embodiment, the damage evaluation tool 112 may be able to analyze one or more photos of the vehicle to determine which components have been damaged. If the damage evaluation tool 112 determines that a component is damaged beyond repair, the tool 112 may retrieve data indicating the price of replacement. In an embodiment, the damage evaluation tool 112 may also be able to retrieve the price of each component from databases of parts manufacturers or other resources.

Manufacturer's data 116 may also include data such as 3-D models of vehicles. In an embodiment, the damage evaluation tool 112 may analyze one or more received photos of the vehicle in comparison to the one or more 3-D models (corresponding to a vehicle of a similar make/model/year). The damage evaluation tool 112 may analyze the comparison to determine which components of the vehicle are damaged and further determine the extent of the damage to the components. Manufacturer's data 116 may also include other data that relevant to vehicles that may be used by the damage evaluation tool 112 to create calculated damage 119a.

Insurance data 117 may include data from insurance providers such as claims data, accident reports, and other data that may be used to calculate damage to a vehicle. In some embodiments, the insurance data 117 may be used to determine calculated damage 119a. In other embodiments, the insurance data 117 may be used to access actual damage which may be used, in conjunction with calculated damage 119a, to refine one or more machine learning algorithms 119b. For example, insurance data 117 may include a claim with one more images of a vehicle which may be used to determine calculated damage 119a. In another example, insurance data 117 may include a claim with one or more images of a vehicle and a cost of repair for the vehicle which may be used as for comparison to determine calculated damages 119a for another vehicle.

The repair data 118 may include data from one or more sources indicative of the cost of repair for vehicles. The repair data 118 may include images, labor costs, location data, dealership data, parts data, and any other data that may be useful for estimating damage to a vehicle.

The damage evaluation tool 112 may include various instructions for execution by a processor 126 to create calculated damage 119a. For example, the tool 112 may retrieve any combination of the above data (and any additional data for determining calculated damage 119a) from databases 116, 117, 118, and 119 to calculate calculated damage 119a using one or more machine learning algorithms 119b. Further, the damage evaluation tool 112 may display the calculated damages via a user interface and/or contact emergency services (in certain embodiments, discussed in greater detail below). The damage evaluation tool 112 is intended to be a dynamic tool which continually improves the accuracy of the calculated damage 119a by implementing machine learning techniques to improve the machine learning algorithms 119b. The damage evaluation tool 112 may implement techniques such as iteration, linear regression, logistic regression, or other known or later developed machine learning techniques to improve the machine learning algorithms 119b (discussed in greater detail below).

Figures 2, 3:
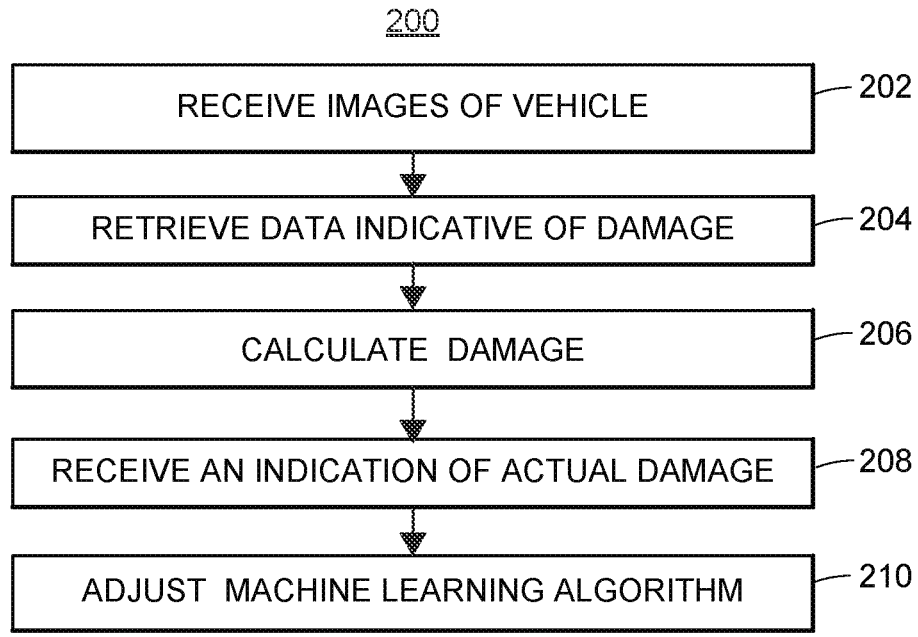
FIG. 2 is a flow diagram of an example method for calculating damage.
FIG. 3 is an illustration of an example user interface for uploading one or more images of a vehicle.

Referring now to FIG. 2, example method 200 for calculating damage are discussed in greater detail. The method 200 may include one or more functions or routines in the form of non-transitory computer-executable instructions that are stored in a tangible computer-readable storage medium and executed using a processor of a computing device (e.g., the computing device 102, the server 120, or any combination of computing devices within the system 100). The routines may be included as part of any of the modules described in relation to FIG. 1, above, or FIG. 6 or 7, below, or as part of a module that is external to the system illustrated by FIGS. 1, 6 and 7. For example, the method 200 may be part of a browser application or another application running on the computing device 102 as a plug-in or other module of the browser application.

FIG. 2 is a flow diagram of an example method 200 for calculating damage. The method 200 may begin by receiving images of a vehicle (block 202). In an embodiment, the system may receive the images via an upload by a user via a client device such as a personal computer, a smartphone, a tablet, etc. An example interface is discussed below with respect to FIG. 3. In this embodiment, the user may implement the system to receive calculated damage in order to determine the best course of repair for the vehicle. In another embodiment, the system may receive the one or more images from a drone or other automated device (e.g., a stoplight camera). In this embodiment, the system may be able to receive the one or more images of the vehicle near the time of the accident. The system may then determine the extent of the damage and possibly issue an alert to emergency services if the accident is deemed to be of substantial severity.

Along with the one or more images, the system may also receive information that may be useful in determining calculated damage such as personal information corresponding to an owner of the vehicle and/or information about the vehicle. FIG. 3, below, discusses the additional information in greater detail.

The system may then retrieve data indicative of damage (block 204). The system may analyze the one or more images to determine the type of data to be retrieved. For example, the system may determine a make/model/year of the vehicle and then retrieve data for that particular vehicle (such as from the manufacturer's data 116). Further, the system may determine one or more components that have been damaged and then retrieve information corresponding to the one or more components. The system may also analyze the one or more images and then retrieve data regarding vehicles with similar types of damage. Examples of the types of retrieved data are discussed in greater detail below with respect to FIGS. 4-5.

The system may then implement one or more machine learning algorithms to calculate damages based on the retrieved data and the received images (block 206). The system may use any of the data described above with respect to databases 116-119 and/or any other data that may be publically available and/or privately available with consent. The system may calculate damage based on the make/model/year of the vehicle, the location of the damage, the extent of the damage, the geographic location of the owner of the vehicle, the costs of repair of similar vehicles, cost of labor, cost of parts, and/or any other data that may provide insight into the extent of damage to the vehicle. The example data provided herein is not intended to be limiting, and the system may use any known or later discovered data that may be helpful for estimating damage to a vehicle.

In an embodiment, the calculated damage may be in the form of an estimated cost of repair. This may be useful for a car owner in determining if it is worth repairing the damage to a vehicle (for example if the damage is merely superficial). In another embodiment, the system may be used by an insurance provider for determining an insurance payout. In another embodiment, the system may be implemented by the owner of a body shop or other vehicle repair shop for offering estimates to clients.

In another embodiment, the calculated damage may be in the form of a numeric score. For example, if the one or more images are received from a drone (or other automated device), the system may determine if the damage is above a certain threshold score. If the calculated damage exceeds the threshold score, the system may send an alert to emergency services, providing the location of the accident and/or a note regarding the severity of the accident. In turn, the system may be implemented as a life-saving emergency service.

The system may then receive an indication of actual damage (block 208). In an embodiment, the system may receive a manual update from a user of the system via a client device (e.g., client device 102 of FIG. 1) indicating that actual cost of repair of the vehicle. In another embodiment, the system may retrieve the actual data from any of the databases 116-119 at a later time. In some embodiments, the system may receive the actual damage as a report from emergency services. In this embodiment, the system may receive an indication whether the damage required an emergency alert.

The system may then adjust the one or more machine learning algorithms used for determining calculated damage (block 210). The system may use the calculated damage in conjunction with the actual damage to determine how to adjust the machine learning algorithm. The system may also receive other information along with the actual damage which may be used in adjusting the machine learning algorithms. The system may be able to calculate damage more accurately with access to larger amounts of data. As the system creates more calculated damages 119a, and subsequently receives indications of actual damage, the system may be able to more accurately fine tune the machine learning algorithms for better precision. The system may implement any known or later developed machine learning, image analysis, data retrieval, and/or other techniques for improving the calculations of damage.

Referring now to FIG. 3, an example user-interface 300 for uploading images is shown. The user-interface 300 may provide a user with the ability to enter personal information 302 and/or information corresponding to the vehicle 304. An embodiment, the data 302 and/or 304 may be used in conjunction with one or more images of the vehicle to calculate damage. In another embodiment, the system may acquire the data 302 and/or 304 by analyzing the one or more received images (e.g., an image of a driver's license, an image of an insurance card). The user-interface 300 includes an icon 306 which may allow a user to access a memory of a client device to upload one or more images.

Figure 4:
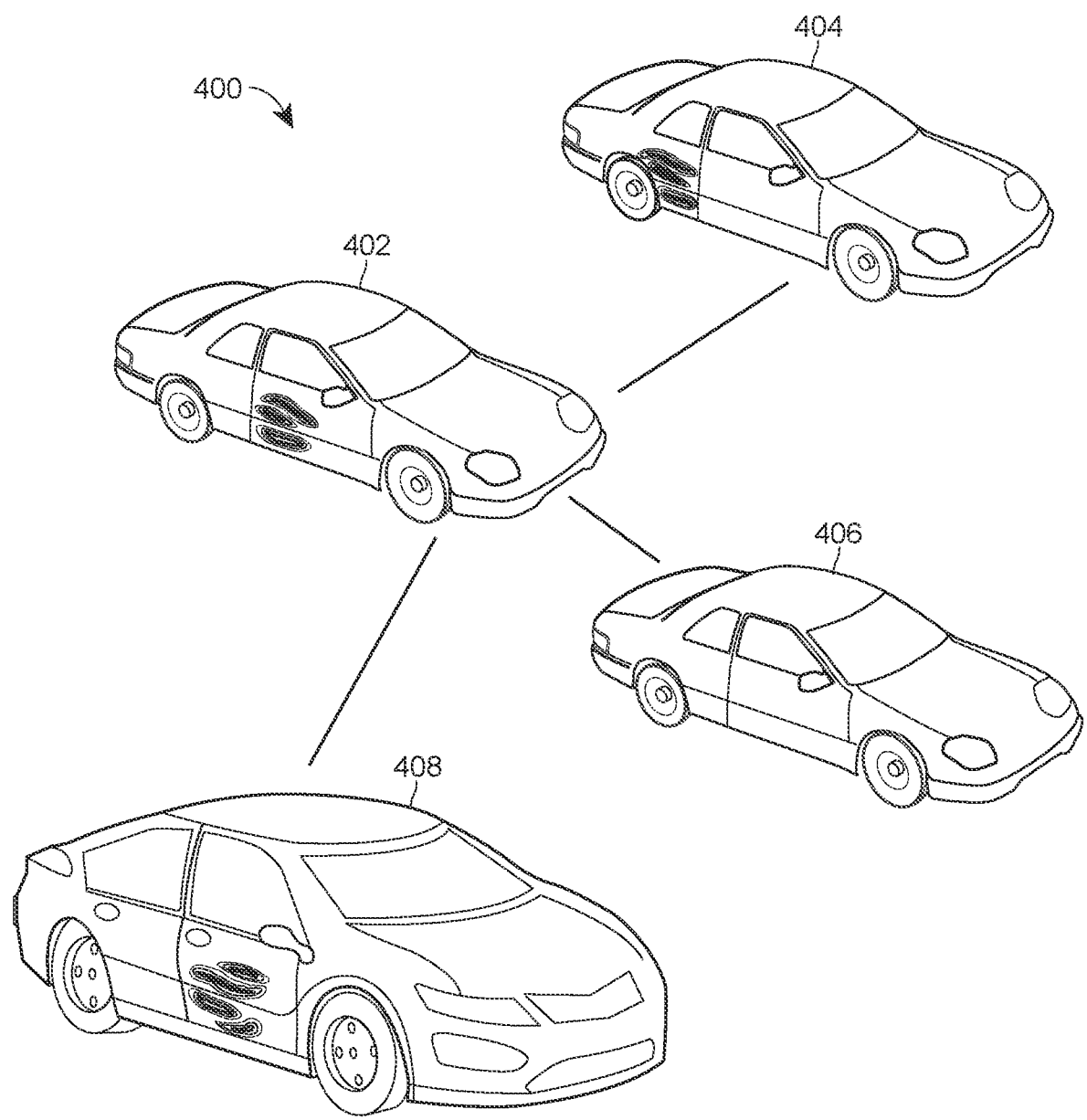
FIG. 4 is an illustration of a schematic diagram of a first example image comparison.

FIG. 4 illustrates an example schematic diagram 400 illustrating how an image of a vehicle may be analyzed. The vehicle 402 is shown to have damage on the passenger side door. In this embodiment, this may be the only image received of the vehicle 402. In another embodiment, this may be one of the one or more images received of the vehicle 402, and a similar analysis may be performed for each of the received images. The system may retrieve data corresponding to the same vehicle (make/model/year) with damage in a similar area (vehicle 404). The system may also retrieve data for an example 3-D model of the vehicle 406 from a manufacturer's database (e.g., database 116 of FIG. 1). The system may also retrieve data corresponding to a similar vehicle 408 with damage in a similar area.

The system may compare the image of the vehicle 402 to any data corresponding to vehicles 404, 406, and/or 408 to calculate damage for vehicle 402. For example, the vehicle 404 may include actual damage data indicating a cost of repair. Similarly, the vehicle 408 may indicate the cost of repair for a vehicle with nearly identical damage which may be used to determine the extent of the damage to the vehicle 402. Further, the vehicle 406 may be used as a point of reference for determining the extent of damage and may also include data indicating the cost of each of the components.

In an embodiment, the vehicle 402 may be received from a drone at the scene of an accident. The system may then retrieve data corresponding to vehicles 404, 406, and/or 408 to determine if an emergency alert should be issued.

Figure 5:
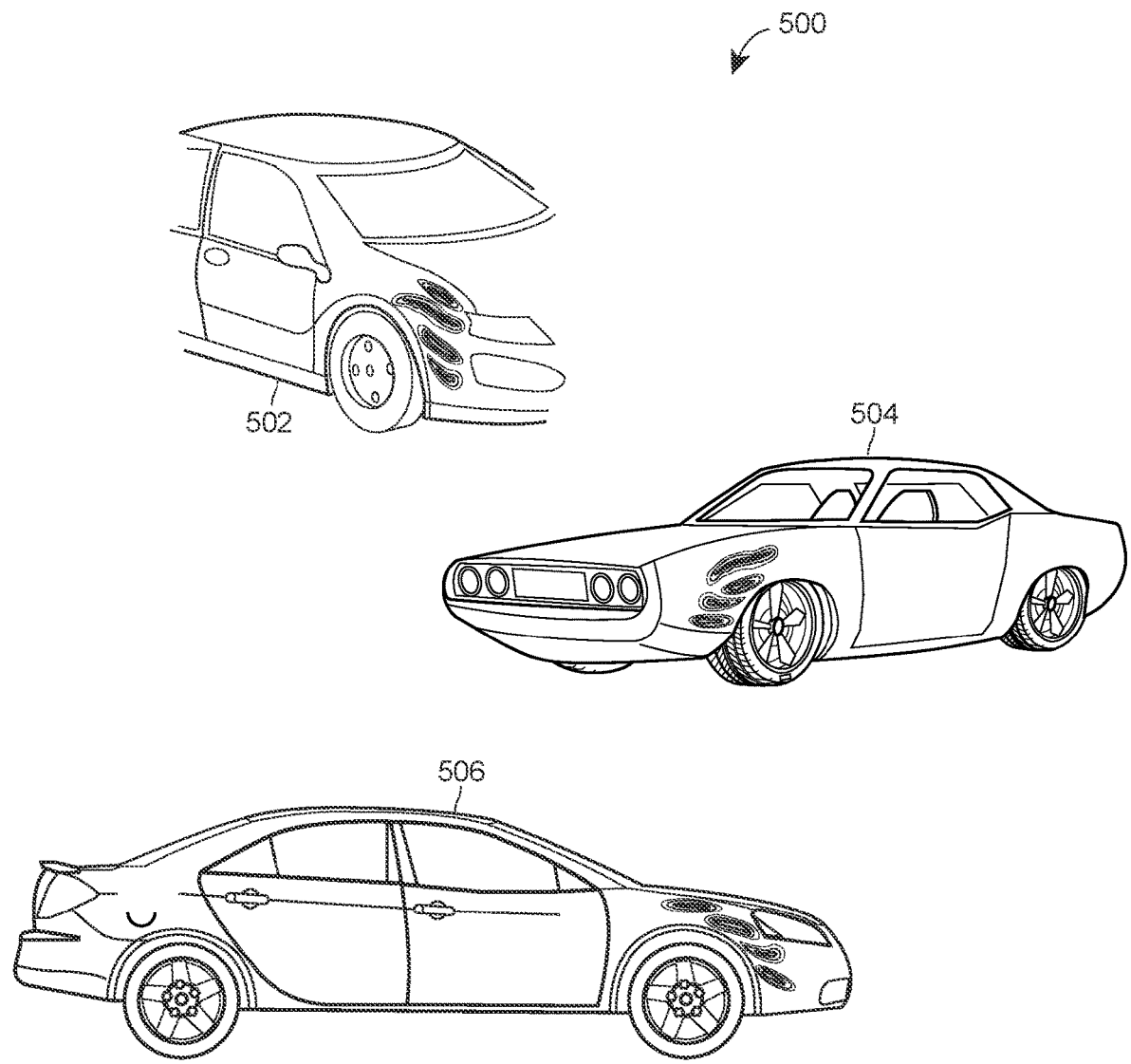
FIG. 5 is an illustration of a schematic diagram of a second example image comparison.

FIG. 5 illustrates another example schematic diagram 500 illustrating how an image of a vehicle may be analyzed. In FIG. 5, the image of the vehicle 502 is a close-up image. In this embodiment, the system may be able to more accurately determine the extent of the damage. However, in this embodiment, the system may not be able to determine data such as the make/model/year of the vehicle. If the data (make/model/year) is not received through a user-interface and/or through other images, the system may retrieve data from a wider variety of sources. For example, the images of vehicles 504 and 506 show vehicles with nearly identical damage. However, the vehicles 504 and 506 are of varying make/model and even style. In fact, the damage to vehicle 504 is on the driver's side as opposed to the passenger's side (like in vehicle 502). However, the data retrieved corresponding to vehicles 504 and 506 can still be used to provide an accurate calculation of damage to vehicle 502.

Further, as the system creates more calculations of damage and collects greater amounts of data, the system will continue to produce more accurate calculations of damage. In particular, the system may even begin to determine accurate calculations of damage with fewer images and/or images of poor quality. For example, in an embodiment, the system may be able to determine the make/model/year of vehicle 502 despite the fact that the image is focuses closely on the damaged area. As the system receives more images and creates more calculations of damage, the system may be able to better analyze the images based on the previously collected data and/or created calculations of damages.

Figure 6:
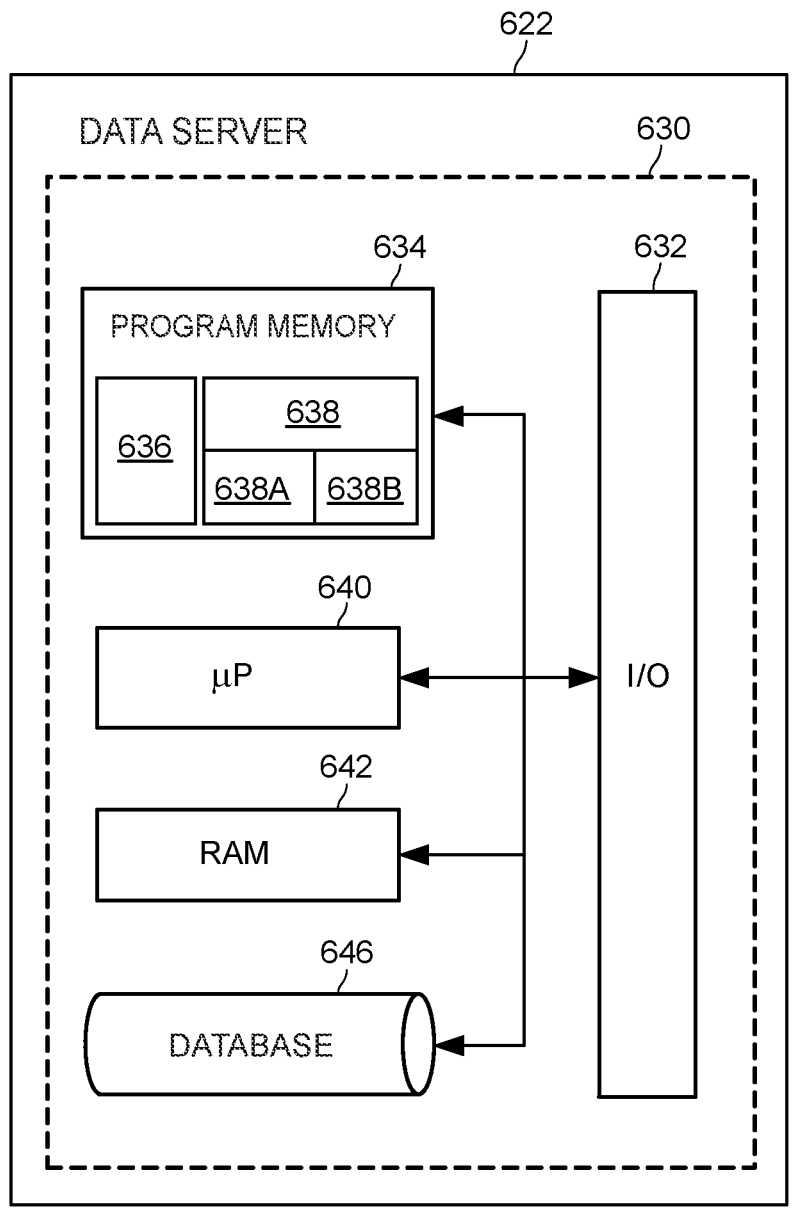
FIG. 6. is an exemplary architecture of a server of a system for calculating damage.

Referring now to FIG. 6, a data server, such as server 120 of FIG. 1, includes a controller 630. The controller 630 includes a program memory 634, a microcontroller or a microprocessor (μP) 640, a random-access memory (RAM) 642, and an input/output (I/O) circuit 632, all of which are interconnected via an address/data bus 644. The program memory 634 may store computer-executable instructions, which may be executed by the microprocessor 640. In some embodiments, the controller 630 may also include, or otherwise be communicatively connected to, a database 646 or other data storage mechanism (one or more hard disk drives, optical storage drives, solid state storage devices, etc.). The database 646 may include data such as machine learning algorithms, calculated damages, etc. It should be appreciated that although FIG. 6 depicts only one microprocessor 640, the controller 630 may include multiple microprocessors 640. Similarly, the memory 634 of the controller 630 may include multiple RAMs 636 and multiple program memories 638, 638A and 638B storing one or more corresponding server application modules, according to the controller's particular configuration.

Although FIG. 6 depicts the I/O circuit 632 as a single block, the I/O circuit 632 may include a number of different types of I/O circuits (not depicted), including but not limited to, additional load balancing equipment, firewalls, etc. The RAM(s) 636, 642 and the program memories 638, 638A and 638B may be implemented in a known form of computer storage media, including but not limited to, semiconductor memories, magnetically readable memories, and/or optically readable memories, for example, but does not include transitory media such as carrier waves.

Figure 7:
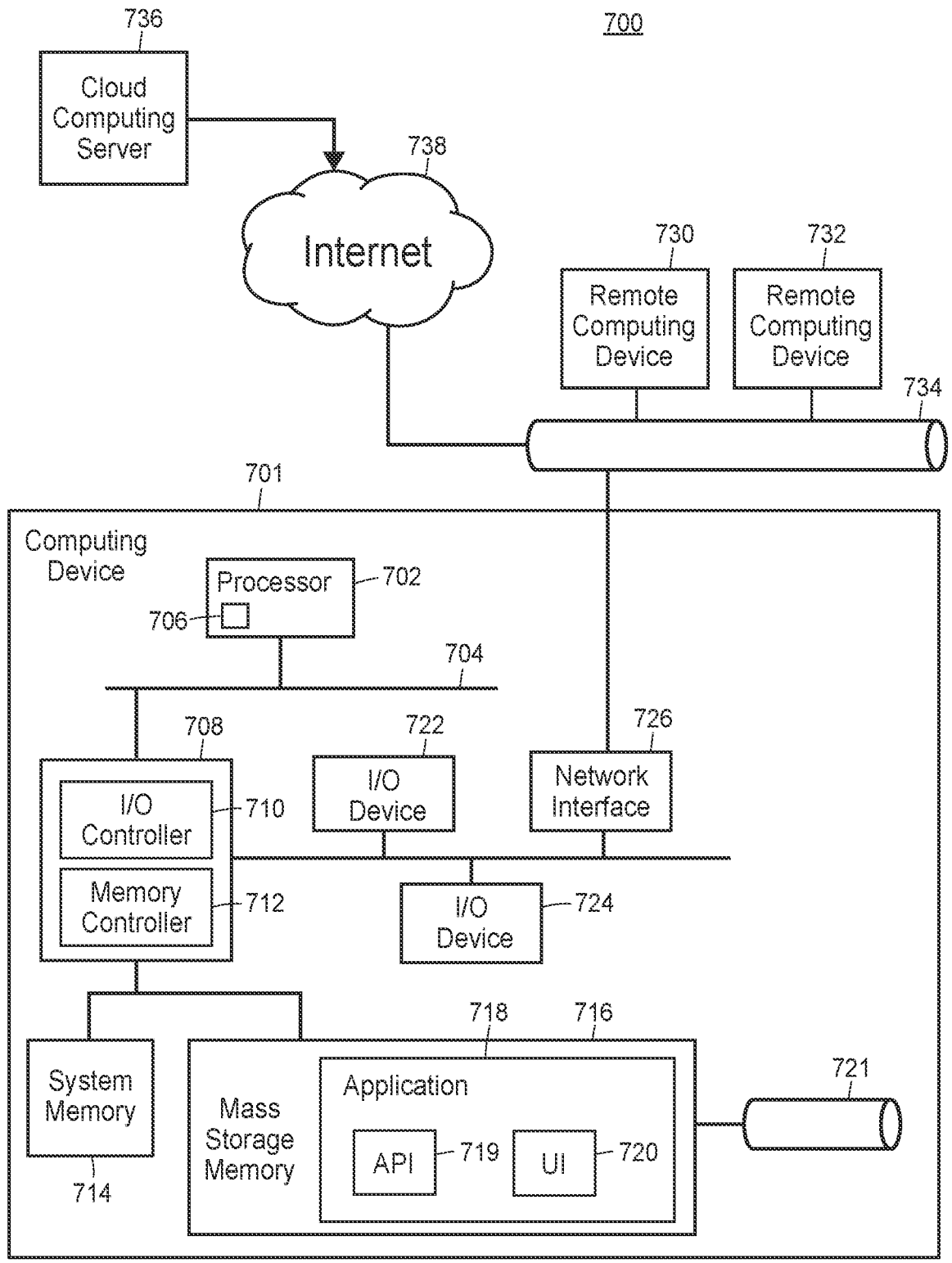
FIG. 7. illustrates a block diagram of a computer to implement the various user interfaces, methods, functions, etc., for calculating damage in accordance with the described embodiments.

FIG. 7 illustrates an exemplary computing environment (e.g., client device 102 of FIG. 1) for implementing the system 100 and method 200 as described herein. As shown in FIG. 7, the computing device 701 includes a processor 702 that is coupled to an interconnection bus 704. The processor 702 includes a register set or register space 706, which is depicted in FIG. 7 as being entirely on-chip, but which could alternatively be located entirely or partially off-chip and directly coupled to the processor 702 via dedicated electrical connections and/or via the interconnection bus 704. The processor 702 may be any suitable processor, processing unit or microprocessor. Although not shown in FIG. 7, the computing device 701 may be a multi-processor device and, thus, may include one or more additional processors that are identical or similar to the processor 702 and that are communicatively coupled to the interconnection bus 704.

The processor 702 of FIG. 7 is coupled to a chipset 708, which includes a memory controller 712 and a peripheral input/output (I/O) controller 710. As is well known, a chipset typically provides I/O and memory management functions as well as a plurality of general purpose and/or special purpose registers, timers, etc. that are accessible or used by one or more processors coupled to the chipset 708. The memory controller 712 performs functions that enable the processor 702 (or processors if there are multiple processors) to access a system memory 714 and a mass storage memory 716.

The system memory 714 may include any desired type of volatile and/or non-volatile memory such as, for example, static random access memory (SRAM), dynamic random access memory (DRAM), flash memory, read-only memory (ROM), etc. The mass storage memory 716 may include any desired type of mass storage device. For example, if the computing device 701 is used to implement a damage evaluation tool 718 having an API 719 (including functions and instructions, such as the method 200 of FIG. 2 described above), and user interface 110 to receive user input, the mass storage memory 716 may include a hard disk drive, an optical drive, a tape storage device, a solid-state memory (a flash memory, a RAM memory, etc.), a magnetic memory (e.g., a hard drive), or any other memory suitable for mass storage. In one embodiment, non-transitory program functions, modules and routines (an application 718, an API 719, and the user interface 110, etc.) are stored in mass storage memory 716, loaded into system memory 714, and executed by a processor 702 or can be provided from computer program products that are stored in tangible computer-readable storage mediums (RAM, hard disk, optical/magnetic media, etc.). Mass storage 716 may also include a cache memory 721 storing application data, user profile data, and timestamp data corresponding to the application data, and other data for use by the application 718.

The peripheral I/O controller 710 performs functions that enable the processor 702 to communicate with peripheral input/output (I/O) devices 722 and 724, a network interface 726, via a peripheral I/O bus 728. The I/O devices 722 and 724 may be any desired type of I/O device such as a keyboard, a display (a liquid crystal display (LCD), a cathode ray tube (CRT) display, etc.), a navigation device (a mouse, a trackball, a capacitive touch pad, a joystick, etc.), etc. The I/O devices 722 and 724 may be used with the application 718 to calculate damage as described in relation to the figures. The local network transceiver 728 may include support for Wi-Fi network, Bluetooth, Infrared, cellular, or other wireless data transmission protocols. In other embodiments, one element may simultaneously support each of the various wireless protocols employed by the computing device 701. For example, a software-defined radio may be able to support multiple protocols via downloadable instructions. In operation, the computing device 701 may be able to periodically poll for visible wireless network transmitters (both cellular and local network) on a periodic basis. Such polling may be possible even while normal wireless traffic is being supported on the computing device 701. The network interface 726 may be an Ethernet device, an asynchronous transfer mode (ATM) device, an 802.11 wireless interface device, a DSL modem, a cable modem, a cellular modem, etc., that enables the system 100 to communicate with another computer system having at least the elements described in relation to the system 100.

While the memory controller 712 and the I/O controller 710 are depicted in FIG. 7 as separate functional blocks within the chipset 708, the functions performed by these blocks may be integrated within a single integrated circuit or may be implemented using two or more separate integrated circuits. The system 700 may also implement the user interface 110 and damage evaluation tool 112 on remote computing devices 730 and 732. The remote computing devices 730 and 732 may communicate with the computing device 701 over a network link 734. For example, the computing device 701 may receive one or more images of a vehicle from one or more of remote computing device 730, 732. In some embodiments, the application 718 including the user interface 110 and tool 112 may be retrieved by the computing device 701 from a cloud computing server 736 via the Internet 738. When using the cloud computing server 736, the retrieved application 718 may be programmatically linked with the computing device 701. The damage evaluation tool application 718 may be a Java® applet executing within a Java® Virtual Machine (JVM) environment resident in the computing device 701 or the remote computing devices 730, 732. The application 718 may also be "plug-ins" adapted to execute in a web-browser located on the computing devices 701, 730, and 732. In some embodiments, the application 718 may communicate with backend components 740 such as the data system 104 via the Internet 738 or other type of network.

The following additional considerations apply to the foregoing discussion. Throughout this specification, plural instances may implement functions, components, operations, or structures described as a single instance. Although individual functions and instructions of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

For example, the network 106, may include but is not limited to any combination of a LAN, a MAN, a WAN, a mobile, a wired or wireless network, a private network, or a virtual private network. Moreover, while only one client computing device is illustrated in FIG. 1 to simplify and clarify the description, it is understood that any number of client computers or display devices are supported and can be in communication with the server 120.

Additionally, certain embodiments are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain functions. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, which may be one of an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or functions described herein may be at least partially processor-implemented. For example, at least some of the functions of a method may be performed by one or more processors or processor-implemented hardware modules. The performance of certain of the functions may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment. For example, at least some of the functions may be performed by a group of computers (as examples of machines including processors). These operations are accessible via a network (e.g., the Internet) and via one or more appropriate interfaces (e.g., application program interfaces (APIs)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data and data structures stored as bits or binary digital signals within a machine memory (e.g., a computer memory). These algorithms or symbolic representations are examples of techniques used by those of ordinary skill in the data processing arts to convey the substance of their work to others skilled in the art. As used herein, a "function" or an "algorithm" or a "routine" is a self-consistent sequence of operations or similar processing leading to a desired result. In this context, functions, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a function, process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a computer system 100 for purposes of illustration only. One of ordinary skill in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and a process for calculating damage through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

Although the above text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term," "is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

What is claimed:

1. A method, comprising:
    accessing image data representing one or more digital images of damage to a vehicle;
    selecting, using one or more processors, an applicable machine learning algorithm from a plurality of different trained machine learning algorithms, wherein the plurality of different machine learning algorithms are trained for respective different combinations of one or more of vehicle make, vehicle model, vehicle year, or area of damage;
    processing the image data, with the applicable machine learning algorithm using one or more processors, to determine assessed damage for the vehicle;
    accessing actual damage information for the vehicle;

determining, using one or more processors, differences between the actual damage and the assessed damage; and iterating, using one or more processors, the applicable machine learning algorithm based on the differences to improve its damage assessment accuracy.

2. The method of claim 1, further comprising:

comparing, via one or more processors, the assessed damage to a threshold damage; and sending, via a computer network, an alert to an emergency service when the assessed damage is above the threshold damage.

3. The method of claim 1, wherein the one or more images are received from an unmanned aerial vehicle having an imaging sensor.

4. The method of claim 1, further comprising:

accessing second image data representing one or more digital images of one or more other vehicles with known actual damage; and processing the image data and the second image data, with the applicable machine learning algorithm using one or more processors, to determine the assessed damage.

5. The method of claim 4, wherein the applicable machine learning algorithm is trained to process the image data and the second image data by:

determining, using one or more processors, differences between the image data and the second image data; and processing the differences with the applicable machine learning algorithm.

6. The method of claim 4, further comprising:

retrieving insurance claim data for the one or more other vehicles; and processing the image data, the second image data and the insurance claim data, with the applicable machine learning algorithm using one or more processors, to determine the assessed damage.

7. The method of claim 6, wherein the applicable machine learning algorithm is trained to process the image data, the second image data and the insurance claim data by:

determining, based on the image data and the second image data, one or more components of the vehicle that are damaged; and determining, based on the one or more components and insurance claim data related to the one or more components, the assessed damage.

8. The method of claim 1, wherein the assessed damage is indicative of a cost of repair for the vehicle.

9. The method of claim 1, wherein iterating the applicable machine learning algorithm comprises at least one of:

adjusting, using one or more processors, one or more equations used to assess damage;

adjusting, using one or more processors, one or more variables of the one or more equations used to assess damage; or adjusting, using one or more processors, one or more weights of the one or more variables of the one or more equations used to assess damage.

10. A system, comprising:

one or more processors; and one or more non-transitory storage media storing instructions that, when executed by the one or more processors, cause the system to:

access image data representing one or more digital images of damage to a vehicle;

select an applicable machine learning algorithm from a plurality of different trained machine learning algorithms, wherein the plurality of different machine learning algorithms are trained for respective different combinations of one or more of vehicle make, vehicle model, vehicle year, or area of damage;

process the image data, with the applicable machine learning algorithm using one or more processors, to determine assessed damage for the vehicle;

access actual damage information for the vehicle;

determine differences between the actual damage and the assessed damage; and iterate the applicable machine learning algorithm based on the differences to improve its damage assessment accuracy.

11. The system of claim 10, further comprising a communication interface, and wherein the instructions, when executed by the one or more processors, cause the system to:

compare the assessed damage to a threshold damage; and send, via the communication interface, an alert to an emergency service when the assessed damage is above the threshold damage.

12. The system of claim 10, wherein the instructions, when executed by the one or more processors, cause the system to:

access second image data representing one or more digital images of one or more other vehicles with known actual damage; and process the image data and the second image data, with the applicable machine learning algorithm using one or more processors, to determine the assessed damage.

13. The system of claim 12, wherein the applicable machine learning algorithm is trained to process the image data and the second image data by:

determining differences between the image data and the second image data; and processing the differences with the applicable machine learning algorithm.

14. The system of claim 12, wherein the instructions, when executed by the one or more processors, cause the system to:

retrieve insurance claim data for the one or more other vehicles; and process the image data, the second image data and the insurance claim data, with the applicable machine learning algorithm using one or more processors, to determine the assessed damage.

15. The system of claim 14, wherein the applicable machine learning algorithm is trained to process the image data, the second image data and the insurance claim data by:

determining, based on the image data and the second image data, one or more components of the vehicle that are damaged; and determining, based on the one or more components and insurance claim data related to the one or more components, the assessed damage.

16. The system of claim 10, wherein the assessed damage is indicative of a cost of repair for the vehicle.

17. The system of claim 10, wherein the instructions, when executed by the one or more processors, cause the system to iterate the applicable machine learning algorithm by at least one of:

adjusting one or more equations used to assess damage;

adjusting one or more variables of the one or more equations used to assess damage; or adjusting one or more weights of the one or more variables of the one or more equations used to assess damage.

18. A non-transitory computer-readable storage media storing computer-readable instructions that, when executed by one or more processors, cause the one or more processors to:

access image data representing one or more digital images of damage to a vehicle;

select an applicable machine learning algorithm from a plurality of different trained machine learning algorithms, wherein the plurality of different machine learning algorithms are trained for respective different combinations of one or more of vehicle make, vehicle model, vehicle year, or area of damage;

process the image data, with the applicable machine learning algorithm using one or more processors, to determine assessed damage for the vehicle;

access actual damage information for the vehicle;

determine differences between the actual damage and the assessed damage; and iterate the applicable machine learning algorithm based on the differences to improve its damage assessment accuracy.

19. The storage media of claim 18, wherein the instructions, when executed by the one or more processors, cause the one or more processors to:

access second image data representing one or more digital images of one or more other vehicles with known actual damage; and process the image data and the second image data, with the applicable machine learning algorithm using one or more processors, to determine the assessed damage.

20. The storage media of claim 19, wherein the instructions, when executed by the one or more processors, cause the one or more processors to:

retrieve insurance claim data for the one or more other vehicles; and process the image data, the second image data and the insurance claim data, with the applicable machine learning algorithm using one or more processors, to determine the assessed damage.

\* \* \* \* \*